United States Patent [19]

Clark et al.

[11] 4,239,668

[45] Dec. 16, 1980

[54] ORGANOTHIOL-CONTAINING SILOXANE RESINS

[75] Inventors: Harold A. Clark, Cape Coral, Fla.; Loren A. Haluska, Midland, Mich.

[73] Assignee: Dow Corning Corporation, Midland, Mich.

[21] Appl. No.: 962,362

[22] Filed: Nov. 20, 1978

[51] Int. Cl.³ .............................. C08J 3/02; C08L 83/04
[52] U.S. Cl. ..................... 260/29.2 M; 106/287.14; 260/33.2 SB; 260/33.4 SB; 428/412; 428/446; 428/450; 525/477; 556/429
[58] Field of Search ................. 260/29.2 M, 33.2 SB, 260/33.4 SB, 448.2 N; 106/287.14; 428/412, 446, 450

[56] References Cited

U.S. PATENT DOCUMENTS

| | | | |
|---|---|---|---|
| 3,986,997 | 10/1976 | Clark | 260/29.2 M |
| 4,173,553 | 11/1979 | Haluska | 260/29.2 M |
| 4,177,175 | 12/1979 | Baney et al. | 260/29.2 M |

*Primary Examiner*—J. Ziegler
*Attorney, Agent, or Firm*—Robert L. McKellar

[57] ABSTRACT

What is disclosed is a composition of matter which is an aqueous dispersion of an organothiolsilsesquioxane and colloidal silica which is useful as an adhesion promoter for siloxane resins which have a low degree of substitution.

2 Claims, No Drawings

ORGANOTHIOL-CONTAINING SILOXANE RESINS

BACKGROUND OF THE INVENTION

Just recently, there was disclosed in U.S. Pat. No. 3,986,997, issued Oct. 19, 1976 to Harold A. Clark and assigned to the Dow Corning Corporation a new type of abrasion resistant coating composition which consists of a stable dispersion of colloidal silica and a silicone resin. These coating compositions are unique because they are clear coatings, have generally higher abrasion resistance than most organic materials used for the same purpose and are substantially easier to prepare and handle. These coatings are also easier to apply and for most coating purposes they adhere very well to the substrate to which they are applied.

There are other silicone resins which have been utilized to coat various substrates for a variety of purposes and whenever there were desirable properties of these resins that those skilled in the art wished to impart to the substrate, there were always ways to gain the necessary adhesion. For example, silicone resins are used on metal substrates for encapsulation purposes but some silicone resins utilized in electrical systems simply would not adhere to the metals. Some of the common approaches to adhesion in these cases was to prime the metal surface with functional silanes such as

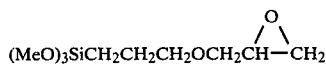

or $(MeO)_3SiCH_2CH_2CH_2NHCH_2CH_2NH_2$, allowing an air dry and then applying the resin or, these silanes were added directly to the resin and then the resin was applied to a cleaned metal substrate. Either way, the above noted silanes seemed to provide good adhesion, presumably due to their compatibility in (or with) the silicone resins having a high degree of organic substitution.

When one scans the prior art surrounding the adhesion of silicone resins to various substrates, one continuous thread winds its way through the publications; there is no universal primer or adhesion additive and therefore cautionary statements are always made in those publications that the substrates and the adhesion promoters have to be matched for the best results.

Thus it is not totally unexpected that the ordinary adhesion promoters discussed above would not function well with the siloxane resins having a low degree of organic substitution.

Moreover, when the siloxane resins are being utilized as abrasion resistant coatings, the organosilanes discussed above are not normally utilized because they tend to destroy the hardness of the coating and therefore its effectiveness as an abrasion resistant coating. One specific example of a surface to which the siloxane resins having a low degree of substitution which do not readily adhere to is polycarbonate. Polycarbonate tends to have inconsistent surface characteristics as it is formed into solid articles and therefore attempts to adhere siloxane resins to such substrates have met with a great deal of difficulty.

What is needed therefore is a means to obtain consistent and uniform adhesion to troublesome substrates so that abrasion resistant siloxane coatings having a low degree of substitiution can be adhered to such substrates.

THE INVENTION

The instant invention consists of a composition of matter which is a pigment-free aqueous composition comprising a dispersion of colloidal silica in lower aliphatic alcohol-water solution, or a dispersion of colloidal silica in ether-esters of ethylene or propylene glycol-water solution, of a partial condensate of a silanol of the formula $RSi(OH)_3$ in which R is selected from HSR'— and $(HS)_2R'$— wherein R' is selected from a group consisting of a divalent or trivalent aliphatic hydrocarbon radical having 1-6 carbon atoms and phenylene, the colloidal silica being present in the amount of 34 to 50 weight percent and the amount of $RSi(OH)_3$ being 50 to 66 weight percent both being based on the total solids in the composition, said composition containing 10-50 weight percent solids, said composition containing sufficient acid to provide a pH in the range of 2.5 to 5.5.

The inventive material is an aqueous composition comprising a dispersion of colloidal silica in lower aliphatic alcohol-water solution, or a dispersion of colloidal silica in ether esters of ethylene or propylene glycol-water, of a partial condensate of a silanol of the formula $RSi(OH)_3$ in which R is selected from HSR— and $(HS)_2R'$— wherein R' is selected from a group consisting of a divalent or trivalent aliphatic hydrocarbon radical having 1-6 carbon atoms and phenylene.

The partial condensate is represented by the general formula $RSi(OH)_3$ in which R represents $(HS)_2R'$— and HSR'. R' in this case is selected from divalent or trivalent aliphatic hydrocarbon radicals of 1-6 carbon atoms and phenylene.

Thus, R' can be, for example,

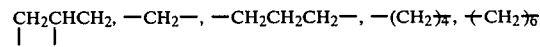

or more specifically,

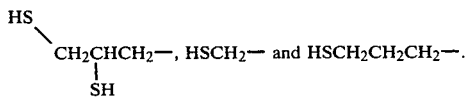

The partial condensate constitutes only a portion of the solids in the composition. The other essential ingredient is colloidal silica.

The aqueous colloidal silica dispersions having a mean particle size in the range of 4–150 millimicrons in diameter are required. These silica dispersions are prepared by methods well-known in the art and are commerically available under such registered trademarks as "Ludox" and "Nalcoag". It is preferred to use colloidal silica of 10—30 mµ particle size. Colloidal silicas of this type are relatively free of $Na_2O$ and other alkali metal oxides, generally containing less than 2 weight percent, preferably less than 1 weight percent $Na_2O$. They are available as both acidic and basic hydrosols. Colloidal silica is distinguished from other water dispersable forms of $SiO_2$, such as nonparticulate polysilicic acid or alkali metal silicate solutions, which are not operative in the practice of the invention.

The silica is dispersed in a solution of the siloxanol carried in a lower aliphatic alcohol-water cosolvent or in an ether ester of ethylene or propylene glycol-water cosolvent. Suitable lower aliphatic alcohols include methanol, ethanol, isopropanol, and n-butyl alcohol. Mixtures of such alcohols can be used. Isopropanol is the preferred alcohol and when mixtures of alcohols are utilized it is preferred to utilize at least 50 weight percent of isopropanol in the mixture to obtain optimum adhesion of the coating. The solvent system should contain from about 20 to 75 weight percent alcohol to ensure solubility of the siloxanol. Suitable ether esters of ethylene or propylene glycol are the well-known low molecular weight solvents such as carbitol acetate i.e. $CH_3COO(CH_2CH_2O)_2C_2H_5$
$CH_3COO(CH_2CH_2O)_2C_4H_9$ and Cellosolve Acetate ® i.e. $CH_3COOCH_2CH_2OC_2H_5$ and such materials as $CH_3COOCH_2CH_2OCH_3$ and $CH_3COOCH_2CH_2OC_4H_9$ and analogs of such materials prepared from propylene glycol. This solvent system should also contain from 20–75 weight percent of the ether esters to ensure solubility of the siloxanol. Optionally one can utilize an additional water-miscible polar solvent, such as acetone, butyl cellosolve and the like in a minor amount, for example no more than 20 weight percent of the cosolvent system.

To obtain optimum properties in the composition, sufficient acid to provide a pH of from 2.5 to 5.5 must be present. Suitable acids include both organic and inorganic acids such as hydrochloric, acetic, chloroacetic, citric, benzoic, dimethylmalonic, formic, glutaric, glycolic, maleic, malonic, toluene-sulfonic, oxalic and the like. The specific acid utilized has a direct effect on the rate of silanol condensation which in turn determines shelf life of the composition. The stronger acids, such as hydrochloric and toluene-sulfonic acid, give appreciably shortened shelf or bath life and require less aging to obtain the described soluble partial condensate. It is preferred to add sufficient water-miscible carboxylic acid selected from the group consisting of acetic, formic, propionic and maleic acids to provide pH in the range of 4 to 5.2 in the composition. In addition to providing good bath life, the alkali metal salts of these acids are soluble, thus allowing the use of these acids with silicas containing a substantial (greater than 0.2% $Na_2O$) amount of alkali metal or metal oxide.

The composition is easily prepared by adding a silane, such as $RSi(OCH_3)_3$, to colloidal silica hydrosols and adjusting the pH to the desired level by addition of the organic acid. The acid can be added to either the silane or the hydrosol prior to mixing the two components provided that the mixing is done rapidly. The amount of acid necessary to obtain the desired pH will depend on the alkali metal content of the silica but is usually less than 10 weight percent of the silica solids. Alcohol is generated by hydrolysis of the alkoxy substitutents of the silane, for example, hydrolysis of one mole of $-Si(OC_2H_5)_3$ generates 3 moles of ethanol. Depending upon the percent solids desired in the final composition, additional alcohol, water or a water-miscible solvent can be added. The composition should be well mixed and allowed to age for a short period of time to ensure formation of the partial condensate. The composition thus obtained is a clear or slightly hazy low viscosity fluid which is stable for several days.

It is desirable to have 34–50 weight percent of colloidal silica and 50–66 weight percent of $RSi(OH)_3$, based on the weight of the colloidal silica and $RSi(OH)_3$. The material is used as a 10–50 weight percent solids aqueous dispersion.

The composition is useful as an additive to silicone resins to enhance the adhesion of the silicone resins to various substrates.

Now, the following example is offered so that those skilled in the art can better understand and appreciate this invention.

EXAMPLE 1

Preparation of 50 weight percent $HSCH_2CH_2CH_2Si(OH)_3$ and 50 weight percent $SiO_2$ solution.

A solution (142.9 grams) of 48.6 grams of a commercially available aqueous dispersion of colloidal silica having an initial pH of 3.1 containing 34% $SiO_2$ of approximately 15 mµ particle size and having an $Na_2O$ content of less than 0.01 weight percent, 94.3 grams of water and 10 grams of glacial acetic acid was placed in a glass reaction flask and there was added thereto 77.2 grams of mercaptopropyltrimethoxysilane with moderate stirring to produce a hydrolyzate containing $HSCH_2CH_2CH_2Si(OH)_3$. 134.6 grams of isopropanol was added, the mixture stirred and then stripped to 48.2% solids and then rediluted with alcohol to 35 percent solids.

Five (5) weight % based on the weight of the total solids of the composition of the example material was added to a heat curable silicone resin of the type described in U.S. Pat. No. 3,986,997, allowed to air dry for ½ hour and then heat cured at 65% relative humidity for 3 hours at 125° C., excellent adhesion was obtained on clear Lexan ® polycarbonate manufactured by the General Electric Plastics Division, Pittsfield, Massachusetts.

That which is claimed is:

1. A pigment-free aqueous composition consisting essentially of a dispersion of colloidal silica in lower aliphatic alcohol-water solution, or a dispersion of colloidal silica in ether-esters of ethylene or propylene glycol-water solution, of a partial condensate of a silanol of the formula $RSi(OH)_3$ in which R is selected from $HSR'$— and $(HS)_2R'$— wherein R' is selected from a group consisting of a divalent or trivalent aliphatic hydrocarbon radical having 1–6 carbon atoms and phenylene, the colloidal silica being present in the amount of 34 to 50 weight percent and the amount of $RSi(OH)_3$ being 50 to 66 weight percent both being based on the total solids in the composition, said composition containing 10–50 weight percent solids, said composition containing sufficient acid to provide a pH in the range of 2.5 to 5.5.

2. A solid substrate containing on its surface a composition as claimed in claim 1.

* * * * *